B. G. MEINIKHEIM & W. D. CHASE.

Said CHASE Assignor to said MEINIKHEIM.

Basket.

No. 8,148. Reissued April 2, 1878.

Witnesses:

D. V. Briesen
John C. Tumbridge

Inventors:

B. G. Meinikheim
W. D. Chase
by their attorney
A. V. Briesen

N. PETERS, PHOTO-LITHOGRAPHER, WASHINGTON, D. C.

UNITED STATES PATENT OFFICE.

BERNARD G. MEINIKHEIM, OF NEWTOWN, AND WILLIAM D. CHASE, OF NEW YORK, N. Y.; SAID CHASE ASSIGNOR TO SAID MEINIKHEIM.

IMPROVEMENT IN BASKETS.

Specification forming part of Letters Patent No. 170,755, dated December 7, 1875; Reissue No. 8,148, dated April 2, 1878; application filed March 12, 1878.

*To all whom it may concern:*

Figure 1:
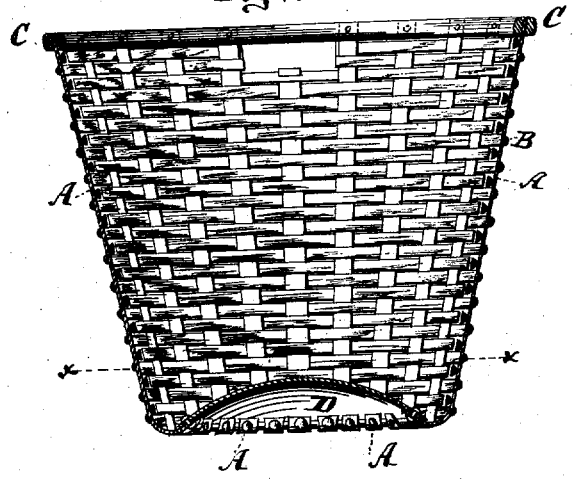
Figure 2:
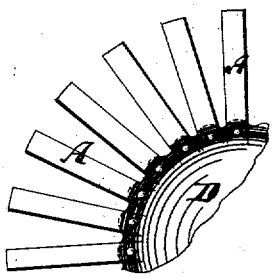
Figure 3:
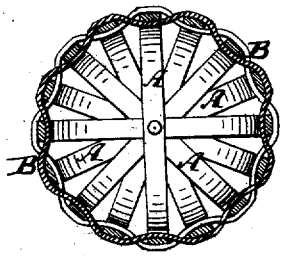

Be it known that we, BERNARD G. MEINIKHEIM, of Newtown, Queens county, New York, and WILLIAM D. CHASE, of New York city, New York, have invented a new and Improved Basket, of which the following is a specification:

Figure 1 is a vertical central section of our improved basket, and Fig. 2 is a partial bottom view of the same. Fig. 3 is a horizontal section of a modification thereof.

Similar letters of reference indicate corresponding parts in both figures.

The object of this invention is to produce a basket of greater strength and durability than those heretofore in use, and one which will constitute a reliable measure for its contents.

The invention consists in constructing a basket of metallic uprights, between which wooden hoops are woven, said uprights giving to the structure a substantial and durable character, while the wood woven between the uprights will protect the metal against injury, and retain in the complete basket all the advantages of the ordinary hoop or woven baskets now in use. The lower ends of the metallic uprights are attached either to a solid metal bottom, or the metallic uprights may be continued underneath to constitute themselves the bottom of the basket.

In the accompanying drawing, the letters A A represent the uprights of the basket, and B B are the horizontal hoops, of wood or other material of the same. The uprights are made of sheet metal, steel, or other metal or alloy, plain or corrugated, or of other style. The upper ends of these uprights are joined by a suitable rim or hoop, C, and their lower ends are shown in Figs. 1 and 2 to be riveted to a concave metallic bottom, D. The wooden hoops B B are woven around the metal uprights A A in the same way in which such hoops are now usually woven around the uprights of fruit-baskets—that is to say, each hoop or piece of wood is laid alternately against the inner and outer faces of the consecutive uprights, as indicated in Fig. 1.

The metallic uprights, instead of being riveted to the metallic bottom, may be continued under the basket, as in Fig. 3, to cross each other under the same, so that they will form the bottom thereof, in which case a separate metal or wooden bottom can be dispensed with.

We are aware that baskets have heretofore been strengthened by metallic taps or braces introduced between the ordinary standards and filling, as in the Patent No. 124,232; but this we do not claim.

We claim as our invention—

1. A basket constructed with metallic uprights A A and wooden hoops B B, woven around said uprights, substantially as shown and described.

2. The basket constructed with metallic uprights A A, wooden hoops B B, and top rim C, said rim serving to join the upper ends of the metallic uprights, substantially as specified.

3. The metallic bottom D, combined with and fastened to the metallic uprights A A of a basket-frame, substantially as specified.

BERNARD G. MEINIKHEIM.
WM. D. CHASE.

Witnesses:
JOHN C. TUNBRIDGE,
JAMES TURK.